UNITED STATES PATENT OFFICE.

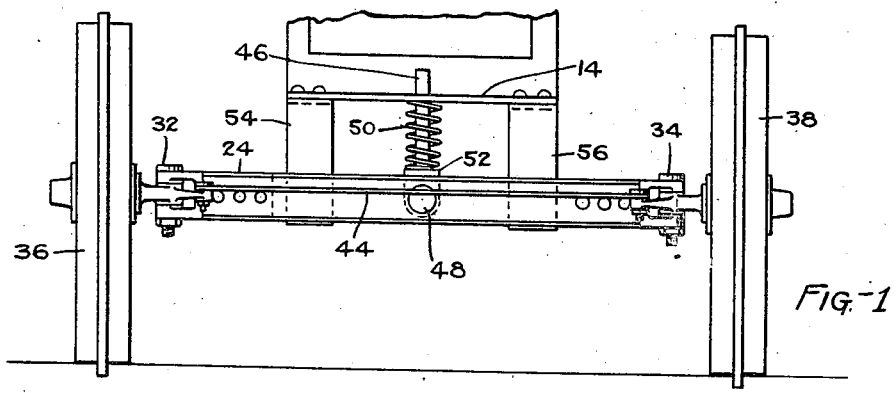
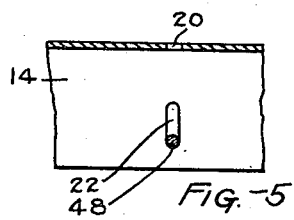
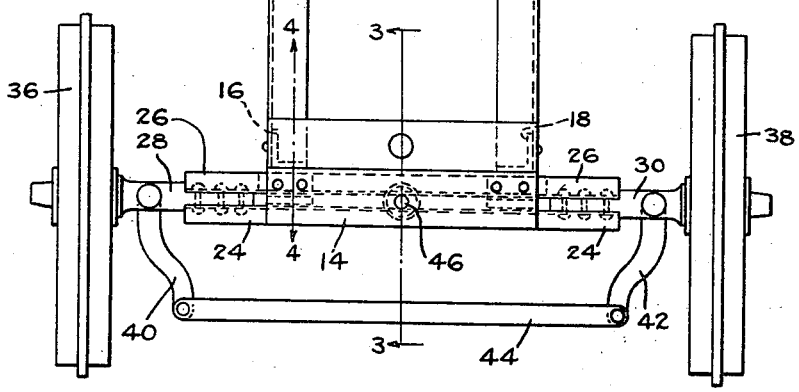
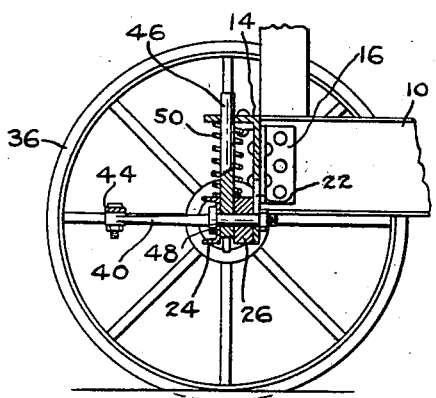
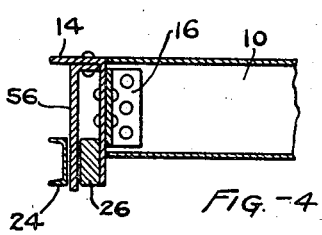

GILBERT AMONSEN AND GEORGE H. AMONSEN, OF MINNEAPOLIS, MINNESOTA.

FRONT-AXLE DEVICE.

1,375,439.   Specification of Letters Patent.   Patented Apr. 19, 1921.

Application filed January 19, 1920. Serial No. 352,307.

*To all whom it may concern:*

Be it known that we, GILBERT AMONSEN and GEORGE H. AMONSEN, citizens of the United States, residing at Minneapolis, in the county of Hennepin and State of Minnesota, have invented certain new and useful Improvements in Front-Axle Devices, of which the following is a specification.

Our invention relates to front axle devices and is intended particularly for use on tractors, although it may be used on other vehicles. The object of our invention is to provide a self-adjustable and self-leveling front axle upon which the front end of the frame is supported by interposed cushioning means so that jar is taken off the frame when the front wheels pass over obstructions or uneven ground.

The full objects and advantages of our invention will appear in connection with the detailed description thereof and the novel features embodied in our inventive idea will be particularly pointed out in the claims.

In the accompanying drawings,—

Figure 1 is a front elevational view. Fig. 2 is a top plan view. Fig. 3 is a view in section on the line 3—3 of Fig. 2. Fig. 4 is a view in section on the line 4—4 of Fig. 2. Fig. 5 is a detail view.

Referring to the construction shown in the drawings, 10 and 12 designate side frame members of a tractor or motor vehicle to the front ends of which is bolted an angle bar 14 by means of angle irons 16 and 18. The horizontal portion of the angle bar 14 is provided at its center with a hole 20 and the vertical portion of the angle bar is provided with a slot 22. The front axle comprises a horizontal member, preferably consisting of two bars 24 and 26 spaced a small amount from each other, and to the ends of these bars are secured the members 28 and 30 which are provided with the steering knuckles 32 and 34 and front wheels 36 and 38. From the steering knuckles extend the rods 40 and 42 which are joined by the connecting bar 44. The upper end of an eye-bolt 46 extends through the hole 20 and the lower end of this bolt extends down between the bars 24 and 26 and is pivotally secured thereto by a pivot bolt 48 which passes through the bars and through the slot 22. A coil spring 50 surrounds the eye-bolt 46 between a shoulder 52 thereon and the horizontal portion of the angle bar 14. Guide members 54 and 56 are bolted to the horizontal portion of the angle bar 14 and these guide members extend down between the bars 24 and 26, being slidable in the space separating the latter.

The operation and advantages of our invention will be readily understood from the foregoing description. The axle may swing in either direction in a vertical plane upon the bolt 48 as a pivot according to whether a front wheel passes over an obstruction or drops into a depression. At the same time the jar is taken off the frame since the front end thereof rests upon the cushioning spring 50 and is free to move up and down, although it is securely held to the front axle by the eye-bolt 46 and the guides 54 and 56.

We claim:

1. A front axle device comprising a normally-horizontal member, an eye-bolt extending upwardly from said member and passing through a hole in the front portion of the vehicle frame, cushioning means upon which the front of the vehicle frame rests, a member secured to the front of the vehicle frame and provided with a vertical slot, and a pivot bolt extending through said horizontal member, the lower end of said eye-bolt and said vertical slot.

2. A front axle device comprising two bars spaced from each other, an eye-bolt extending upwardly from between said bars, a horizontal member secured to the front of the vehicle frame, said eye-bolt passing through a hole in said horizontal member, cushioning means upon which said horizontal member rests, a vertical member secured to the front of the vehicle frame and provided with a vertical slot, and a pivot bolt extending through said axle bars, the lower end of said eye-bolt and said vertical slot.

3. A front axle device comprising two bars spaced from each other, an eye-bolt extending upwardly from between said bars, an angle bar secured to the front end of the vehicle frame, said eye-bolt passing through a hole in the horizontal portion of said angle bar, a coiled spring surrounding said eye-bolt and upon which said horizontal portion rests, the vertical portion of said angle bar being provided with a vertical slot, a pivot bolt extending through said axle bars, the lower end of said eye-bolt and said vertical slot, and guides secured to the horizontal portion of said angle bar, said guides extending down into the space between said axle bars.

In testimony whereof we hereunto affix our signatures.

GILBERT AMONSEN.
GEORGE H. AMONSEN.